United States Patent [19]

Ohnuki et al.

[11] Patent Number: 4,804,986
[45] Date of Patent: Feb. 14, 1989

[54] CAMERA

[75] Inventors: Ichiro Ohnuki, Tokyo; Keiji Ikemori, Kanagawa; Masaharu Eguchi, Tokyo, all of Japan

[73] Assignee: Canon Kabushiki Kaisha, Japan

[21] Appl. No.: 813,670

[22] Filed: Dec. 26, 1985

[30] Foreign Application Priority Data

Dec. 26, 1984 [JP] Japan ................... 59-276922
Dec. 26, 1984 [JP] Japan ................... 59-276923
May 13, 1985 [JP] Japan ................... 60-102397

[51] Int. Cl.$^4$ .................. G03B 1/24; G03B 9/08; G03B 9/40
[52] U.S. Cl. .................. 354/212; 354/226; 354/246
[58] Field of Search ............... 354/187, 202, 212, 226, 354/233, 236, 288 R, 288 U, 204–206, 173.1, 151–159, 173.11, 241–244

[56] References Cited

U.S. PATENT DOCUMENTS

| | | | |
|---|---|---|---|
| 521,563 | 6/1894 | Delug | 354/187 |
| 2,215,271 | 9/1940 | May | 354/202 |
| 2,266,656 | 12/1941 | Nuchterlein | 354/205 |
| 2,927,518 | 3/1960 | Dorr | 354/288 U |
| 2,948,204 | 8/1960 | Kopp et al. | 354/288 U |
| 3,685,414 | 8/1972 | Good | 354/187 |
| 3,832,727 | 8/1974 | Seiden | 354/187 |
| 3,838,923 | 10/1974 | Deconinck | 354/233 X |
| 3,975,750 | 8/1976 | Yoshino et al. | 354/187 X |
| 3,984,854 | 10/1976 | Wolcott | 354/288 U |
| 4,273,432 | 6/1981 | Matsuda et al. | 354/173.1 X |
| 4,616,913 | 10/1986 | Suzuki et al. | 354/173.1 |

FOREIGN PATENT DOCUMENTS

| | | | |
|---|---|---|---|
| 583514 | 9/1933 | Fed. Rep. of Germany | 354/187 |
| 1009014 | 5/1957 | Fed. Rep. of Germany | 354/202 |
| 1202635 | 10/1965 | Fed. Rep. of Germany | 354/233 |
| 2451308 | 5/1975 | Fed. Rep. of Germany | 354/242 |

Primary Examiner—W. B. Perkey
Attorney, Agent, or Firm—Toren, McGeady & Associates

[57] ABSTRACT

In a single-lens reflex camera having a shutter device for opening and closing a shutter by causing the leading and trailing curtains of the shutter to travel, the shutter device is arranged away from an aperture toward a photo-taking lens; and the component members of the camera body including a film cartridge chamber, a spool chamber, sprocket, etc. can be laterally positioned to come within a projected image of the shutter device at least on the side of the aperture.

2 Claims, 12 Drawing Sheets

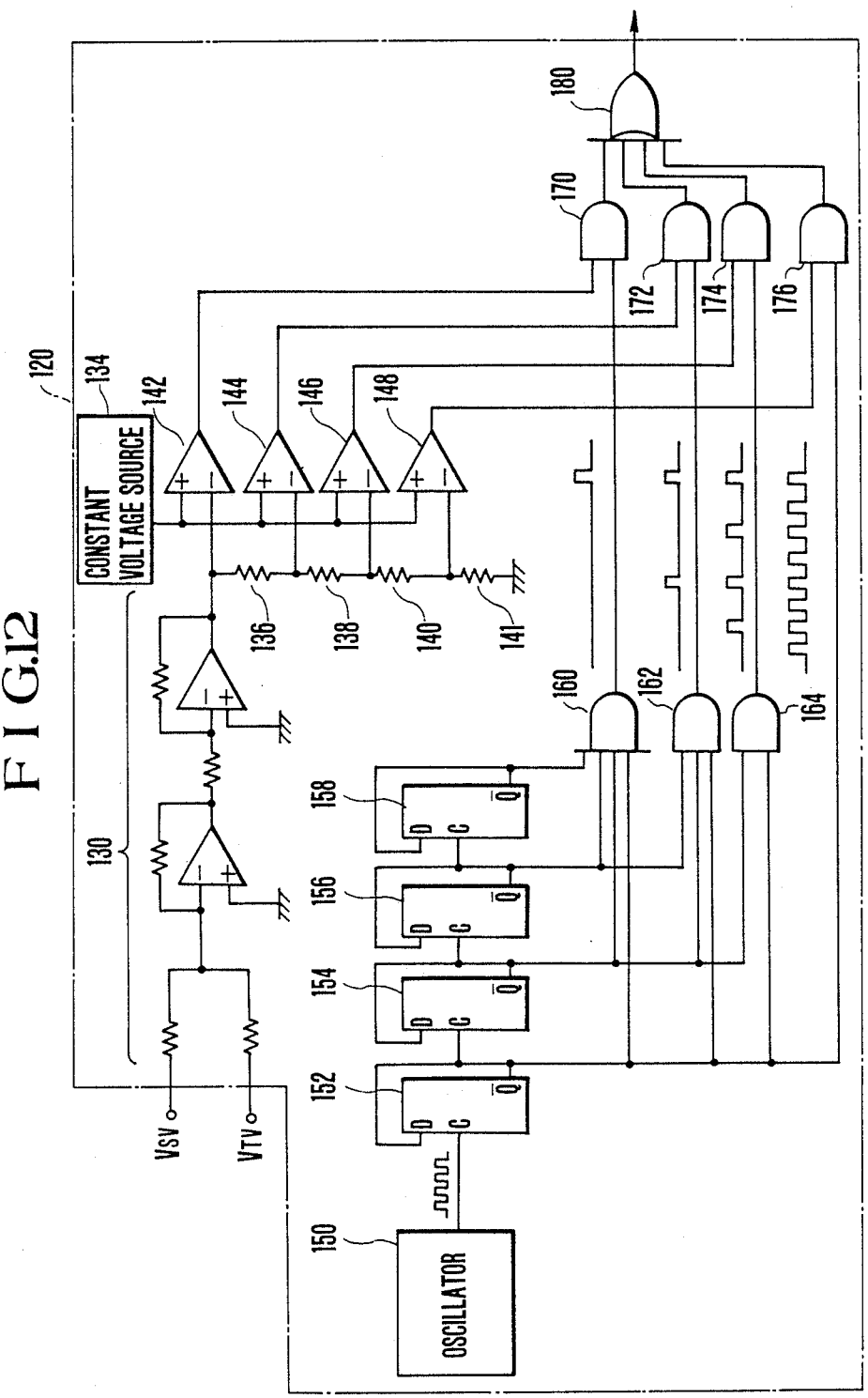
F I G. 12

F I G. 13
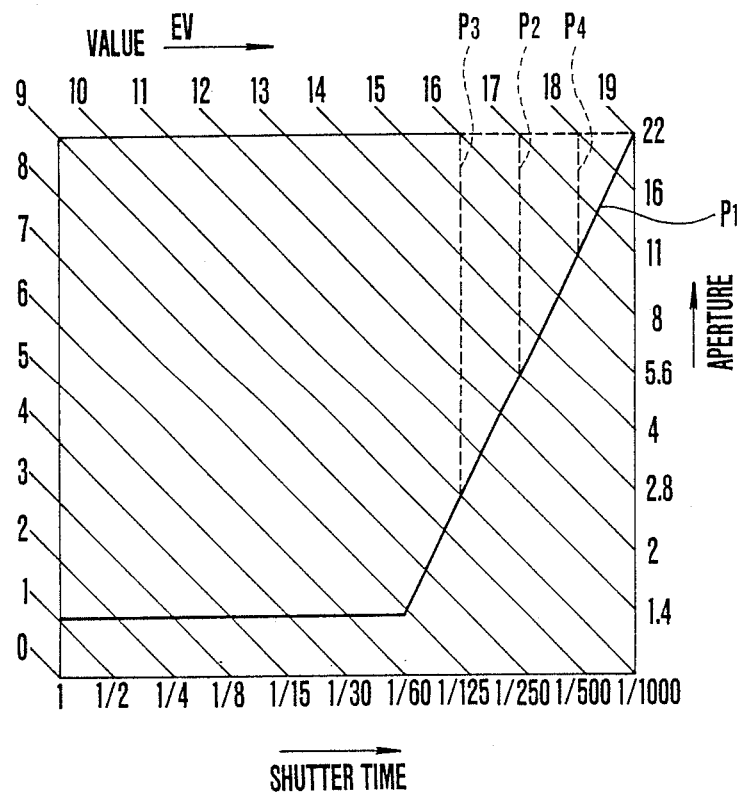

CAMERA

BACKGROUND OF THE INVENTION

1. Field of the Invention

This invention relates to the structural arrangement on the periphery of the shutter device of a single-lens reflex camera.

2. Description of the Prior Art

FIGS. 1 and 2 of the accompanying drawings show, in outline, the structural arrangement of the conventional camera. A photo-taking lens 4, which is a photo-taking optical system, consists of four lens units, including a first lens unit 1, a second lens unit 2, a third lens unit 3 and a fourth lens unit 4. Generally, these lens units are incorporated in an interchangeable lens barrel. The illustrations include a diaphragm 5; and a movable mirror 6 which is swingably disposed within a photo-taking optical path. Under the condition as shown in FIG. 1, a light flux coming from an object through the photo-taking lens units 1 to 4 is guided by the mirror 6 to a view finder optical system. Under a mirror uplifted condition which is not shown, the mirror 6 is retracted from the phototaking optical path to allow the light flux of the object to reach the surface of a film in use. The view finder optical system consists of a focusing screen 7, a pentagonal roof type prism 8 and an eye-piece lens 9. A reference numeral 10 denotes a camera body. An aperture 10a is arranged to determine a film exposing area. A numeral 10b denotes an image forming plane on which the film comes to abut. A focal plane shutter device 11 includes a base plate 11a and a cover plate 11b. Within a space formed between the base plate 11a and the cover plate 11b, there are provided leading and trailing shutter curtains 11c and 11d each of which consists of a plurality of divided blades. These shutter curtains 11c and 11d are arranged to travel downward from above, as viewed in FIG. 1, at a time difference between them corresponding to a given shutter time.

Referring to FIG. 2, the camera body 10 includes a spool chamber 10c and a film cartridge chamber 10d which are formed on the right- and left-hand sides of the camera body. In the spool chamber 10c there is arranged a film winding device including a film take-up spool 12 which forms a film winding transmission system having, for example, a motor as a drive source. The film winding transmission system also includes a sprocket 13 which is disposed close to the aperture 10a. The lateral dimension of the shutter device 11 is arranged to be larger than the opening dimension of the shutter. More specifically, there are provided left and right stowing spaces 11f for the blades forming the leading and trailing shutter curtains 11c and 11d, because these blades are lengthened for the purpose of preventing them from jumping out of position. A shutter drive unit 11e is arranged to drive the shutter. A reference symbol L1 denotes a light flux which is to be imaged at the center of an image plane; and a symbol L2 denotes a light flux to be imaged at a peripheral part of the image plane.

The conventional single-lens reflex camera, which is arranged as described above, requires the following points: First, the shutter device 11 is disposed in a position nearly abutting on the aperture 10. Second, the full open dimensions of the shutter device 11 must be the same as the opening dimensions of the aperture 10a both in height and in width. Thirdly, the shutter device 11 must have a larger width than its opening width because of the stowing spaces 11f required as mentioned above. These requirements necessitate that the spool chamber 10c, the film cartridge chamber 10d and the sprocket 13, which are components of the camera body, to be approximately aligned side by side with the aperture 10a on both sides of the aperture are arranged away from the aperture 10a to an extent corresponding to the stowing spaces 11f of the shutter device 11. This has caused an increase in the width of the camera body.

Meanwhile, the conventional single-lens reflex camera has been required to satisfy the following various conditions in its light receiving arrangement for light or distance measurement:

(1) The light receiving optical system must be simple in structure and easily adjustable. (2) Must be capable of giving a sufficient light quantity. (3) Must be capable of giving a desired photometric sensitivity distribution.

To meet these conditions (1), (2) and (3), the conventional camera has been provided with the following light receiving arrangement and particularly the following photo-sensitive element arrangement:

(a) The light from the object is arranged to be received from a focusing screen with a photo-sensitive element disposed in the neighborhood of the eye-piece lens of a view finder optical system; (b) the focusing screen of the view finder optical system is obliquely cut and the cut parts are cemented in the middle part thereof to make the cemented face into a half-mirror in such a manner as to guide a portion of the light flux of the middle part of the focusing screen to the photo-sensitive element disposed on one side of the focusing screen; (c) the main mirror, which is arranged to reflect the object light toward the view finder optical system at its lowered position, is arranged to be semi-transmissive at the middle part thereof and a sub-mirror is disposed behind the semi-transmissive part while a photo-sensitive light receiving element is disposed in a position to receive the light of the object reflected by the sub-mirror; and (d) when a photo-taking operation is performed, the light of the object reflected by the film surface is arranged to be received by the photosensitive element which is disposed in front of the film surface.

However, the above-stated conventional arrangements (a) to (d) are incapable of satisfying all of the above-stated conditions (1), (2) and (3). Especially, in carrying out light measurement, it has been difficult to obtain an even photo-sensitivity distribution for the object light received at different areas. In other words, for example, it has been difficult to adequately carry out a split light measuring operation or the like.

Meanwhile, it has been practiced to provide a camera with a data imprinting device. The data imprinting device is incorporated in the back lid of the camera and is arranged to perform imprinting from behind the film. In that instance, a data is imprinted via an antireflection layer (or a backing layer) provided on the reverse surface of the film. However, the degree of difference in sensitivity between the front and reverse surfaces varies with the kind of the film. This results in different densities of the imprint. To solve this problem, there has been proposed an improved method of imprinting the data from the front of the film which has an emulsion layer. In the case of a single-lens reflex camera or the like where a shutter is arranged immediately before the film, however, the density of the data imprint comes to vary with the shutter speed. This has presented a problem.

SUMMARY OF THE INVENTION

It is an object of this invention to provide a single-lens reflex camera which is arranged in a compact size by shortening the width of the camera body.

The above and further objects and features of the invention will become apparent from the following detailed description of preferred embodiments thereof taken in conjunction with the accompanying drawings.

BRIEF DESCRIPTION OF THE DRAWINGS

FIG. 12 is a circuit diagram showing the details of the essential parts of FIG. 11.

FIG. 13 is a diagram showing the program of the camera shown in FIG. 8.

DETAILED DESCRIPTION OF THE PREFERRED EMBODIMENTS

Figure 1:
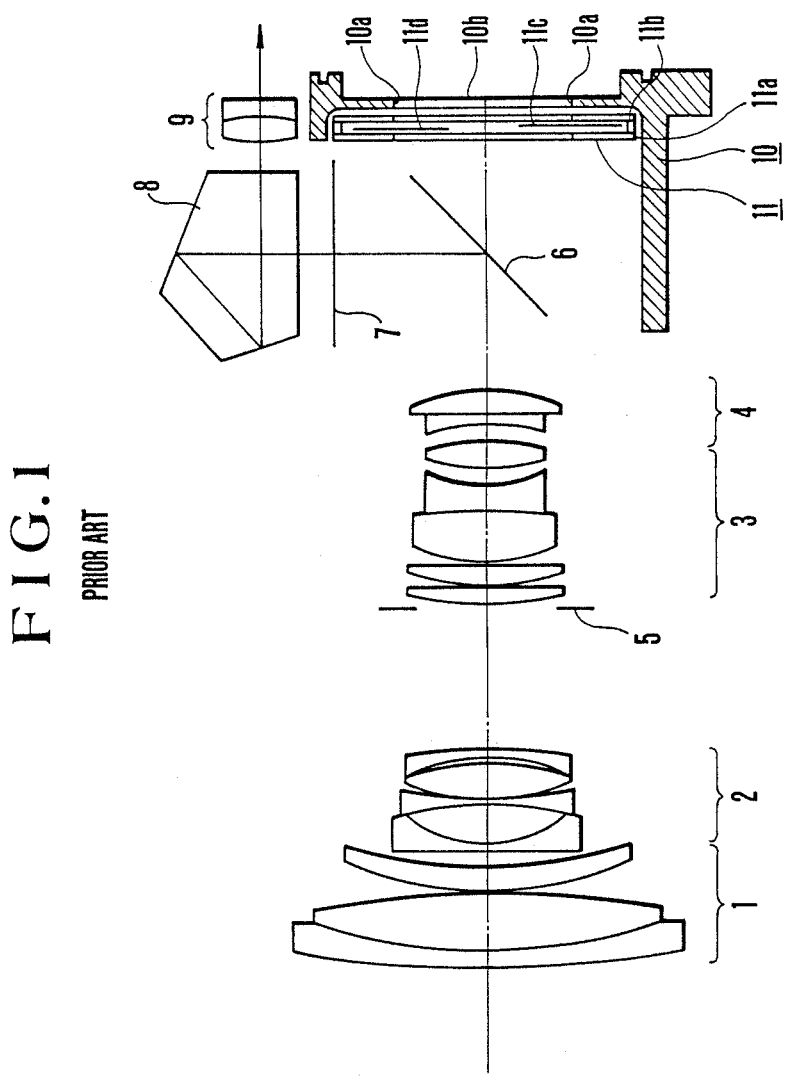
FIG. 1 is a side view showing, in outline, the structural arrangement of the conventional single-lens reflex camera.
Figure 2:
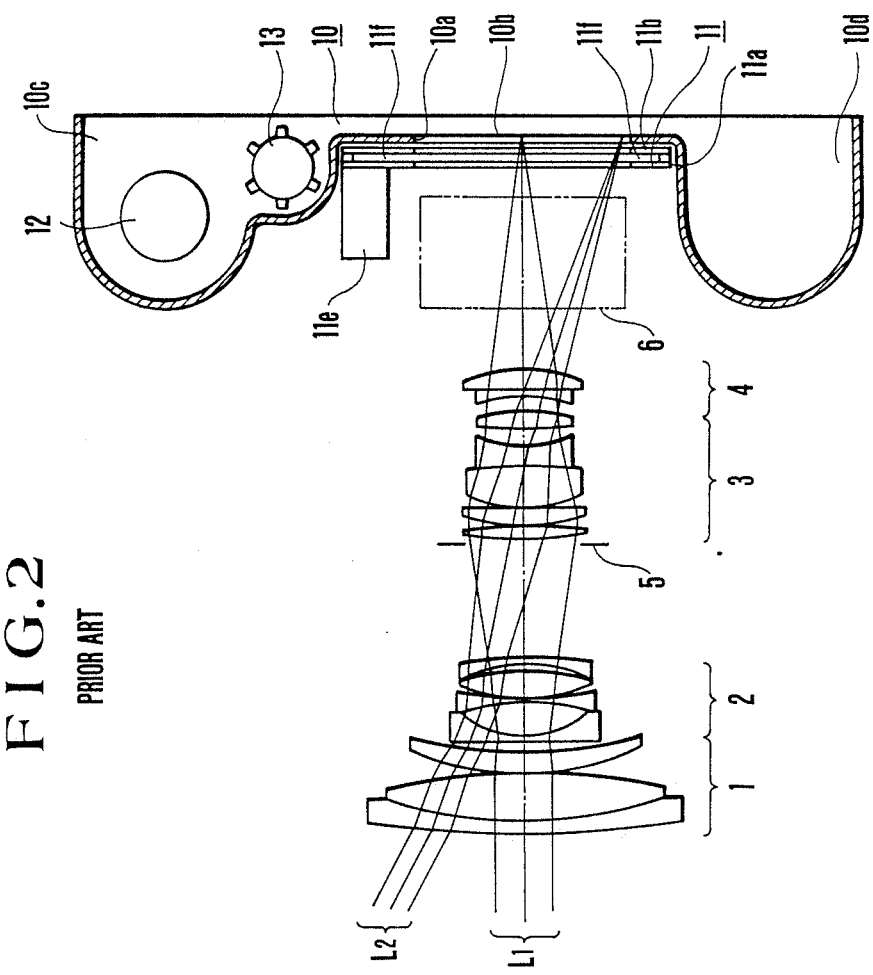
FIG. 2 is a plan view showing the camera of FIG. 1.
Figure 3:
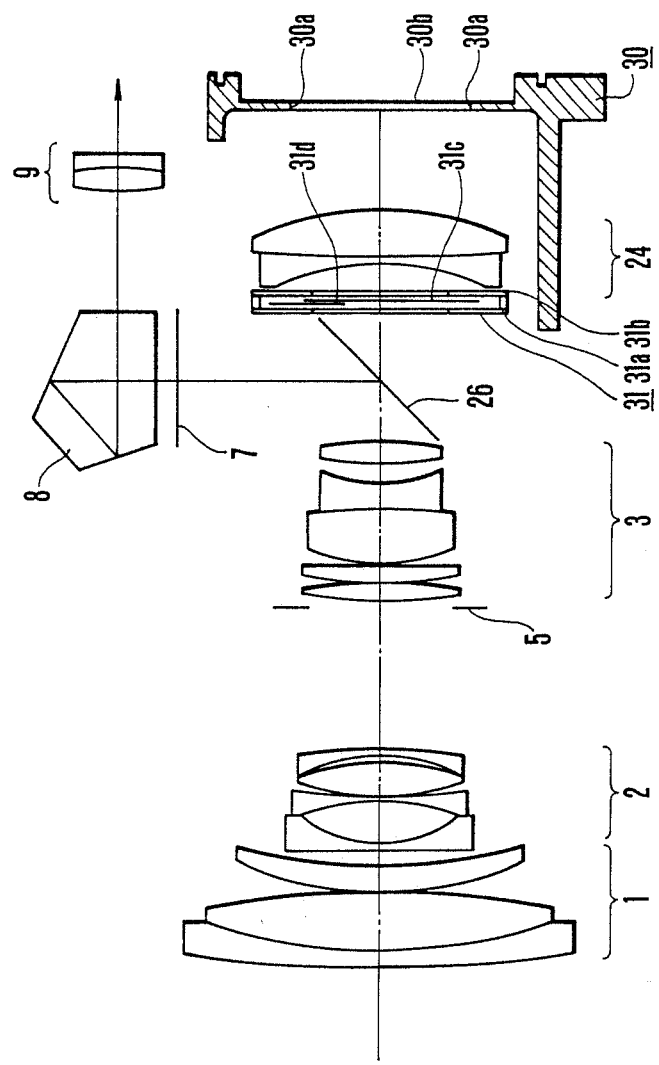
FIG. 3 is a side view showing in outline the structural arrangement of a single-lens reflex camera arranged according to this invention as a first embodiment thereof.
Figure 4:
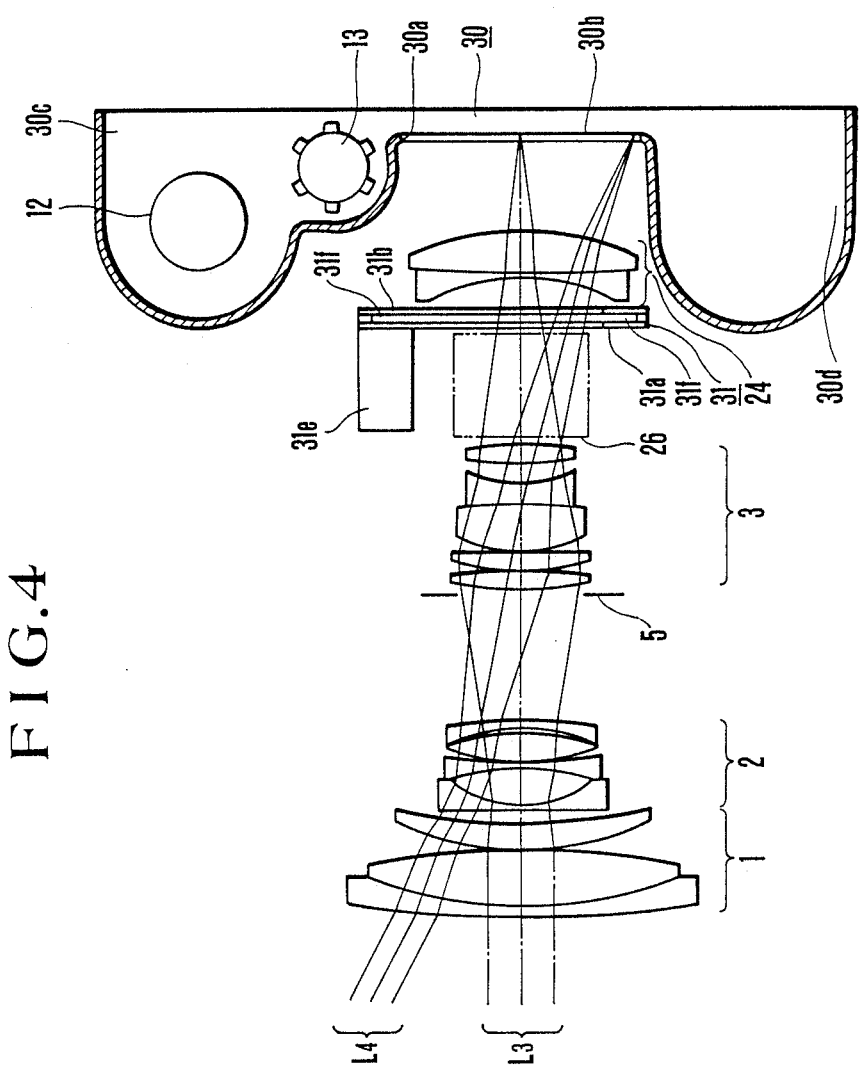
FIG. 4 is a plan view showing the camera of FIG. 3.

A first embodiment of this invention is arranged as shown in FIGS. 3 and 4. The same reference numerals and symbols that are used in FIGS. 1 and 2 for the conventional camera are used in FIGS. 3 and 4 for indicating the same parts. A fixed type half reflection mirror 26 is arranged in a state of being tilted about 45 degrees. This mirror 26 serves in that obliquely fixed state to guide a light coming from an object to be photographed to a view finder optical system as well as to allow the light of the object to come to the film surface by passing through the mirror. A fourth lens unit 24 of the photo-taking lens is disposed in between a shutter device 31 and an aperture 30a and is arranged to function like a telephoto converter. By this arrangement, an image of the object to be photographed is formed on the surface of the film, which is not shown but is disposed at about the same position as the aperture 30a. The illustration includes a camera body 30; the aperture 30a; an image forming plane 30b on which the film comes to abut; a spool chamber 30c and a film cartridge chamber 30d; and a shutter device 31.

The shutter device 31 includes a base plate 31a; a cover plate 31b; a leading shutter curtain 31c; a trailing shutter curtain 31d; a shutter drive unit 31e; and left and right stowing spaces 31f. The basic structural arrangement of the embodiment is identical with the shutter device 11 of the conventional camera described in the foregoing. However, in the case of this embodiment, the shutter opening size is arranged to be smaller than the conventional camera as will be described later herein. A light flux L3 is to be imaged at the middle of the image plane, while another light flux L4 is to be imaged at a peripheral part of the image plane.

A feature of this embodiment resides in that: The shutter device is positioned away from the position of the aperture 30a and closer to lens units 1, 2 and 3 of the photo-taking lens. Meanwhile, the positions of a sprocket 13 and the spool chamber 30c are shifted laterally inward to come within a projected image of the shutter device 31. These shift positions enable the camera body 30 to be arranged in a smaller width (or in a smaller vertical size as viewed in FIG. 4) than the conventional camera body, so that the embodiment can be made in a smaller side than the conventional camera.

Further, with the shutter device 31 arranged away from the aperture 30a in the case of this embodiment, the shutter device 31 is in a position where the light of the object is somewhat converged. This permits the shutter opening dimensions of the shutter device 31 to be arranged smaller, so that the shutter device can be arranged in a smaller size. This, in turn, enables at least the film cartridge chamber 30d which is a component part of the camera body and is located on one side of the shutter device 31, to be positioned somewhat closer to the center of the camera body. Therefore, this advantage also contributes to reduction in the lateral size of the camera body 30. It is another advantage of the embodiment that, since the opening dimensions of the shutter device 31 can be made smaller, the flash device synchronizing speed of this embodiment becomes faster than that of the conventional camera. More specifically, assuming that the travelling speed of the shutter curtains is v and their travelling distance is A, a maximum shutter opening time T can be expressed by the following formula: T=A/v. Therefore, the flash device synchronizing speed of the shutter can be increased according as the shutter opening size decreases.

A further advantage of the embodiment resides in that the smaller shutter opening size results in reduction in the size of the blades of the leading and trailing shutter curtains 31c and 31d. Therefore, the travelling speed of the shutter curtains can be increased by using the same driving force.

It is a still further advantage of this embodiment that: With the shutter device 31 positioned away from the aperture 30a, the half reflection mirror 26 which is arranged to guide the light of the object to the view finder optical system is naturally positioned also away from the aperture 30a. As a result, it performs the half reflecting action on a converged light of the object, so that the mirror 26 can be arranged to have a smaller area than the conventional mirror. That advantage thus also contributes to reduction in the size of the camera. Further, unlike the conventional movable type mirror, this half reflection mirror 26 is arranged to be in a fixed state. This completely obviates the necessity of providing the mirror 26 with front and rear spaces or clearances for allowing it to be movable. Therefore, the mirror 26 can be positioned close to the shutter device 31 and the third lens unit 3. This again contributes to reduction in the size of the camera. It goes without saying that, since the shutter device 31 and the half reflection mirror 26 can be arranged in a smaller size as a whole, the dimention of the camera in the direction of its height can be also reduced.

Figure 5:
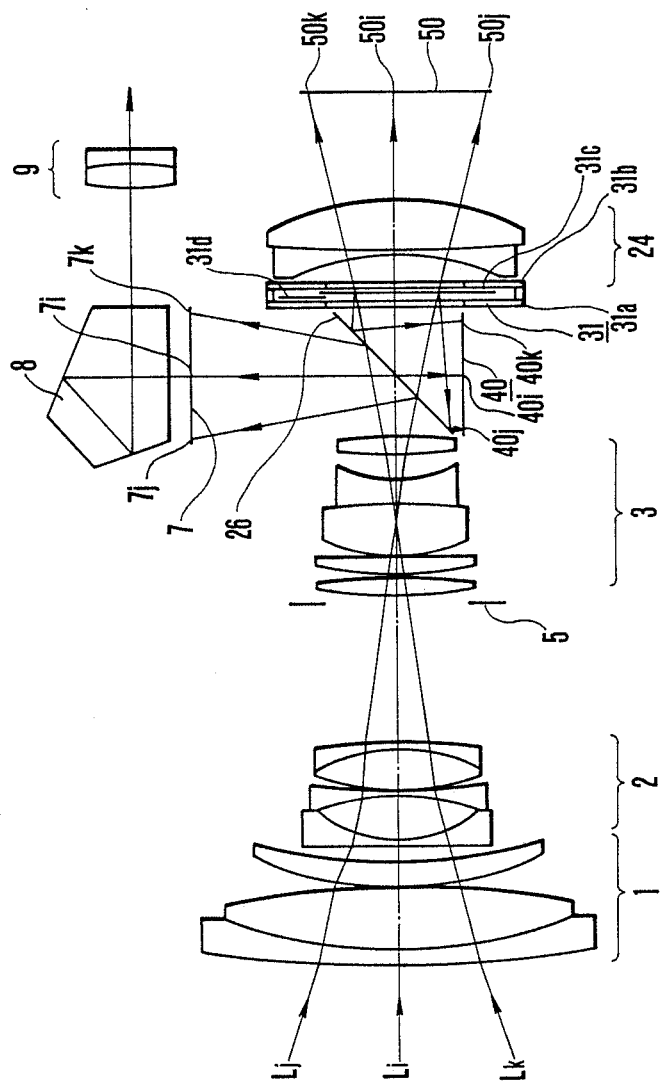
FIG. 5 is a side view showing, in outline, the structural arrangement of a single-lens reflex camera arranged according to this invention as a second embodiment thereof.
Figure 6:
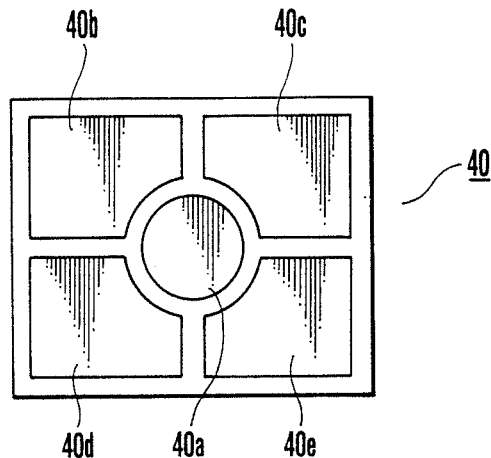
FIG. 6 is an enlarged plan view showing a light receiving photo-sensitive element of FIG. 5.
Figure 7:
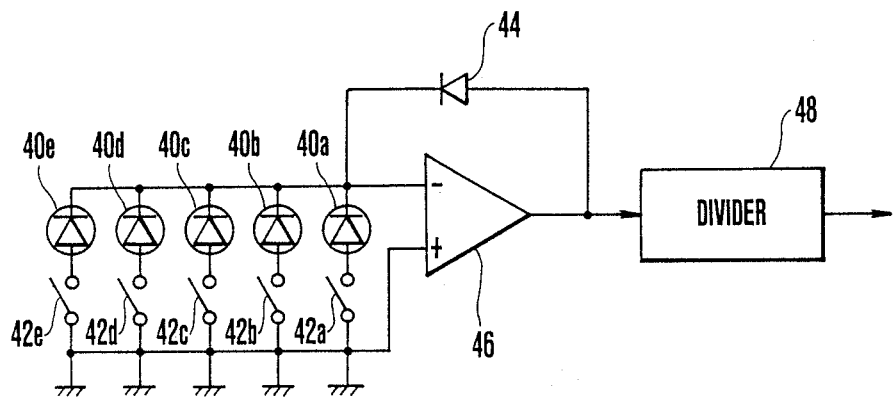
FIG. 7 is a circuit diagram showing the essential parts of a light measuring circuit arranged in the second embodiment shown in FIG. 5.

A second embodiment of this invention is arranged as shown in FIGS. 5, 6 and 7, in which the same parts as those of the first embodiment are indicated by the same reference numerals. A camera body 30 is loaded with a film 50. A half reflection mirror 26 is arranged to allow the light of the object which comes through a photo-taking lens to be reflected to a view finder optical system and also to come to the film 50 by passing through the mirror. The mirror is fixedly set aslant at an angle of about 45 degrees to the photo-taking optical axis. A light measuring photosensitive element 40 is disposed in a position where the object light, which is coming through the photo-taking lens and the half reflection mirror 26, is reflected by the blade surface of a shutter 31 and is again reflected by the reverse surface of the half reflection mirror 26 to come to the element 40. In short, the light measuring photo-sensitive element 40 is disposed at an image forming distance beneath the half reflection mirror 26. The beams of light of the object Li, Lj and Lk incident on the first lens unit 1 of the photo-taking lens partially passes through the half reflection mirror 26 to reach the shutter 31. When the shutter 31 is open for an exposure, these beams of light pass through the shutter 31 to reach points 50i, 50j and 50k on the surface of the film 50. Meanwhile, the remainders of these beams of light are reflected by the half reflection mirror 26 to reach points 7i, 7j and 7k on the surface of a focusing screen 7. The film 50 and the focusing screen 7 are located at different distances from the half reflection mirror 26. However, the fourth lens unit 24 of the phototaking lens is arranged to have them in an optically conjugate relation. Therefore, both the film 50 and the focusing screen 7 have images of the object formed thereon, respectively.

During the process of light measurement initiated by the first step of an operation on a shutter release button or the like, the shutter 31 remains closed by the leading curtain 31c of the shutter. In this instance, therefore, the beams of light of the object Li, Lj and Lk which have passed the half reflection mirror 26 are reflected by the leading shutter curtain 31c and are again reflected by the reverse surface (on the side opposite to the photo-taking lens side) of the half reflection mirror 26. After that they reach the points 40i, 40j and 40k of the photo-sensitive element 40 which is located in the axial direction of the light flux reflected by the reverse side of the mirror 26. In this specific embodiment, the optical path length from the half reflection mirror 26 to a point where the beams of light reach the photo-sensitive element 40 is arranged to be equal to the optical path length between the mirror and the focusing screen 7. Therefore, the photo-sensitive element 40 also has an image of the object formed thereon. The conjugate relation between the light receiving photo-sensitive element 40 and the focusing screen 7 (or the surface of the film 50) becomes shorter, accordingly, as the reflecting surface of the leading shutter curtain 31c is arranged to be closer to that of the surface of a mirror. The leading shutter curtain 31c can be arranged to be closer to a mirror surface by various methods including, for example, applying a glossy plating layer to the surface of the blades of the leading curtain 31c; applying high reflection factor particles to the surface by a vapor deposition process; etc.

Such being the arrangement, a light measuring operation can be accomplished with completely uniform sensitivity distribution all over the surface of the photosensitive element 40. Therefore, the light measurement which is performed by one of various photometric methods, including an averaging method, a spot measuring method, etc., can be accomplished more accurately than with the conventional camera. Further, the photo-sensitive element 40 is arranged to be of a sufficiently large size to be capable of receiving the whole of the object light passing through the half reflection mirror 26. Therefore, it can receive any part of the object light to permit adoption of any of the varied light measuring methods with ease. Further, an adverse effect of a change in the sensitivity distribution resulting from displacement of the photo-sensitive element 40 can be minimized. In addition to these advantages, this embodiment enables the photo-sensitive element 40 to receive the incident light in sufficient quantity. More specifically, let us assume the following as feasible conditions: The transmission factor of the half reflection mirror 26 is 70%; the reflection factor at the surface and the reverse surface of the half reflection mirror 26 is 30%; and the reflection factor of the leading shutter curtain 31c is 80%. Under these conditions, the rate of the object light receivable by the photo-sensitive element 40 can be expressed as: $0.7 \times 0.8 \times 0.3 = 0.168$. The rate is thus about 17%, which is an extremely large value as compared with the conventional light measuring arrangement. Therefore, the measurable limit on the lower luminance side can be broadened in accordance with the arrangement of this embodiment.

Referring to FIGS. 6 and 7, the light measuring method is as follows: FIG. 6 shows specific arrangement of the photo-sensitive element 40. The element 40 is divided into photo-sensitive elements 40a to 40e which are, for example, SPC's (silicon photo-cells). Spot light measurement can be accomplished by individually using one of these elements 40a to 40e while averaging light measurement can be accomplished by using all of these elements. It is, of course, possible to perform light measurement by using these elements in any one of varied combinations.

FIG. 7 shows the essential parts of a light measuring circuit. The above-stated light receiving photosensitive elements 40a to 40e are interconnected in parallel with each other by means of change-over switches 42a to 42e. To facilitate understanding, these switches 42a to 42e are shown as mechanical switches. However, in an actual circuit arrangement embodying this invention, they are semiconductor switches. The output terminals of these photo-sensitive elements 40a to 40e are connected to the two input terminals of an operational amplifier 46. To the feedback loop of the operational amplifier 46 is connected a diode 44 which is arranged to logarithmically compress the photo currents of the photo-sensitive elements 40a to 40e. A divider 48 is connected to the output terminal of the operational amplifier 46. When two or more of these elements 40a to 40e are turned on, the divider 48 performs a dividing operation to bring a logarithmically compressed photo current value into an apposite value in a well known manner.

With the light measuring circuit arranged in this manner, a measured light value of only the middle part of the object to be photographed is obtained in the form of a logarithmically compressed value when the switch 42a is closed. In case that all the switches 42a to 42e are closed and a measured light value thus obtained is divided by the divider 48 into an apposite value, an averaged measured light value is obtained in the form of a logarithmically compressed value.

Further, the rest of the light measuring circuit, which is not shown in FIG. 7, includes a computing circuit, a real time expansion circuit, etc., which are well known and therefore do not require detailed description here.

In the embodiment described above, the shutter 31 may be arranged in a different manner for attaining the same advantageous effect. For example, the shutter may be replaced with a laterally travelling focal plane shutter having leading and trailing shutter curtains wound around drums and arranged to laterally travel. The light receiving photo-sensitive element 40 which is an SPC also may be replaced with some other element, that is, for example, one made of an amorphous silicone material.

The light receiving arrangement of this invention is not only applicable to a light measuring arrangement, as in the case of the embodiment described, but also likewise advantageously applicable, for example, to a distance measuring arrangement in which the light of the object or a light flux projected for measuring an object distance is arranged to be received.

A third embodiment of this invention is arranged as shown in FIGS. 8 to 13. In these drawings, the parts arranged in the same manner as those employed in the first and second embodiments are indicated by the same reference numerals and symbols. The third embodiment includes a known transmission type liquid crystal 62 which is, in this case, used for data imprinting. Although it is not shown in the drawings, the liquid crystal 62 is segmentally arranged to imprint a numeral, alphabetical letters, etc. in a known manner. An LED 60 is employed as a data imprinting light emitting element. An image forming lens 64 is used for the data imprinting purpose. An imprinting data of the liquid crystal 62 is arranged to be imaged on the focusing screen 7 and the film 50. A shutter 31 includes leading and trailing curtains each of which consists of a plurality of blades in the same manner as in the cases of the first and second embodiments. In response to an operation on a shutter release button, the leading shutter curtain first travels to open the shutter 31. Then, after the lapse of a set shutter time, the trailing shutter curtain travels to close the shutter 31.

Figure 8:
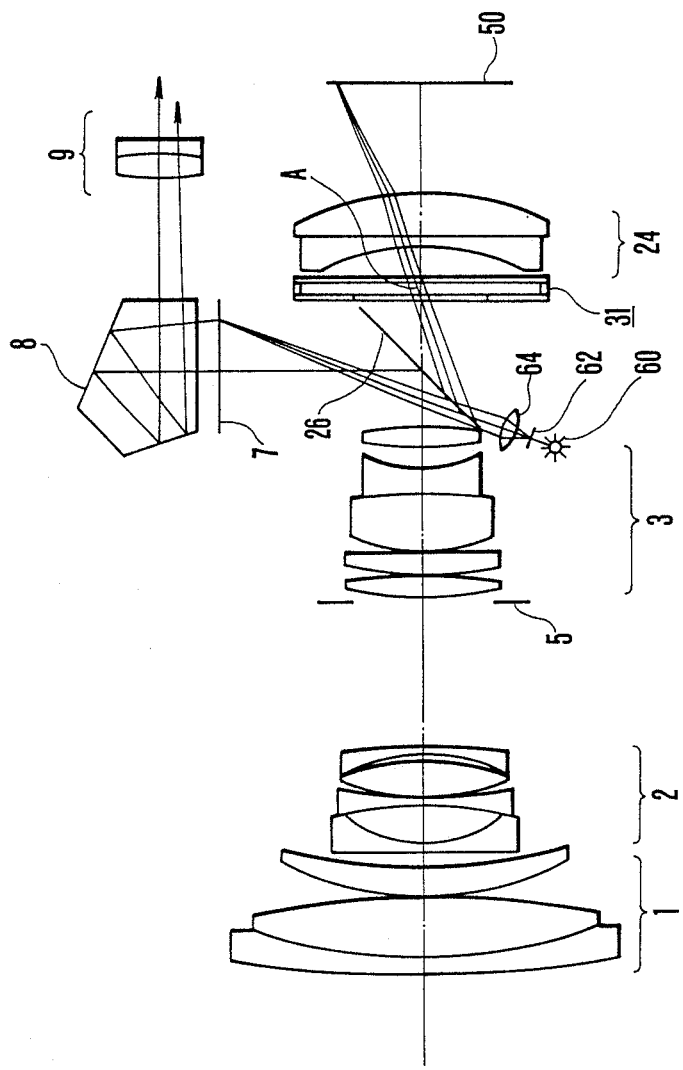
FIG. 8 is a side view showing, in outline, the structural arrangement of a single-lens reflex camera arranged according to this invention as a third embodiment thereof.

In the case of an optical system shown in FIG. 8, the film 50 is disposed away from the shutter 31. The fourth lens unit 24 is interposed in between the shutter 31 and the film 50 and is arranged to have the two in a conjugate relation. Further, in this optical system, the half reflection mirror 26 is fixed and a light flux for data imprinting is directed toward the mirror 26. Therefore, a portion of this light flux is reflected to be imprinted on a edge part of the film 50 while another portion of the light flux comes to a view finder optical system 7, 8 and 9 by passing through the half reflection mirror 26. This enables the photographer to confirm through the view finder the data imprinting arrangement and the data to be imprinted.

Figure 9A:
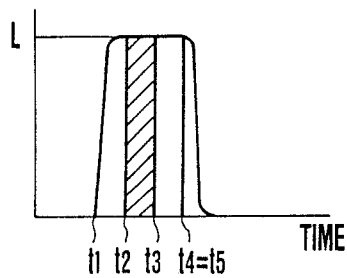
FIGS. 9(a) to 9(c) are graphs showing a control operation on the data imprinting light quantity of the third embodiment shown in FIG. 8.
Figure 9B:
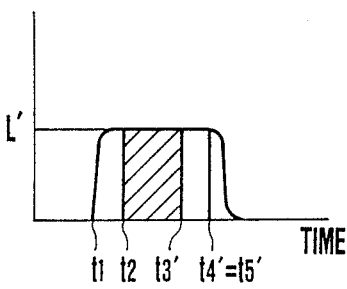
Figure 9C:
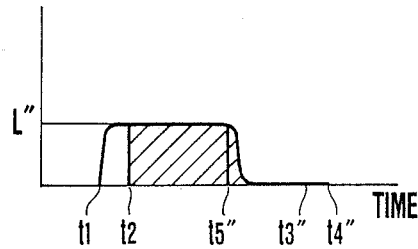

In accordance with the arrangement of this embodiment, a data, which is formed by means of the transmission type liquid crystal 62, is arranged to be imprinted on the film 50 through the shutter 31. The imprinting operation thus must be synchronized with the opening time of the shutter 31. The shutter 31 in this case is of the kind called a focal plane shutter wherein the leading and trailing shutter curtains are arranged to travel while keeping a predetermined slit width between them. FIGS. 9(a) to 9(c) show the passing state of the shutter curtains at an arbitrary point A of the opening of the shutter 31 together with the transmission state of the data imprinting light flux. In each of FIGS. 9(a) to 9(e), the axis of abscissa indicates time. At a point of time t1, the leading shutter curtain begins to travel and the LED 60, which is provided for data imprinting, begins to emit light. At a point of time t2, the leading curtain passes the point A. At a point of time t3, t3' or t3", the trailing curtain passes the point A. At a point of time t4, t4' or t4", the travel of the trailing curtain comes to an end. At a point of time t5, t5' or t5", the light emission by the LED 60 comes to a stop. Meanwhile, the axis of ordinate of each of these drawings indicates the intensity of the imprinting light flux passing the point A. In other words, the axis of ordinate indicates the luminance value of the light emitted by the LED 60.

In this embodiment, the LED 60, which is employed as the light emitting element for data imprinting, is controlled as follows: The light emission luminance is adjusted in cases where the shutter time is faster than a certain given value while the light emission time is adjusted in the event of a shutter time slower than the given value. The outline of this control is as described in the following with reference to FIGS. 9(a) to 9(c): FIG. 9(a) represents a case where the shutter time is a relatively high speed. In this instance, the leading shutter curtain begins to travel in response to a leading curtain travel start signal at the point of time t1. Then, the LED 60 also begins to emit a light flux in response to the same signal. The leading curtain comes to pass the point A at the point of time t2, which comes at a time lag corresponding to the travelling speed of the leading curtain. Therefore, the light flux of the LED 60 which passed through the point A begins to reach the film 50 at the point of time t2. Following that, after the lapse of a predetermined shutter time, the trailing shutter curtain passes the point A at the point of time t3. The imprinting light flux is then blocked by the trailing curtain. The trailing curtain completes its travel at the point of time t4 at a time lag corresponding to the travelling speed of the trailing curtain. A switch, which is interlocked with the trailing curtain, then produces a travel completion signal. The light emission by the LED 60 comes to a stop in synchronism with this signal. Further, according to the light emitting characteristic of the LED 60, there arises some delay both at the rise and fall of the light emission as shown in the drawing.

The following formula of the APEX system applies also to data imprinting:

$$Av + Tv = Bv + Sv \tag{1}$$

Therefore, from the shutter time Tv, the aperture value Av of the imaging lens 64 and film sensitivity Sv, the luminance (or brightness) Bv of the LED 60 which is used as the light emitting element can be obtained from the following formula:

$$Bv = Av + Tv - Sv \tag{2}$$

The LED is therefore arranged to emit the light flux at a luminance corresponding to the value Bv obtained from the above formula (2). Further, the symbols Av, Tv, Bv and Sv which are used in this specification are assumed to have been reduced to values applicable to the APEX computation formula, respectively.

FIG. 9(b) represents a case where the shutter time is a lower speed than in the case of FIG. 9(a). In this instance, the point of time t1 at which the leading shutter curtain begins to travel and the LED begins to emit the light flux and another point of time t2 at which the leading curtain passes the point A remain unchanged from the case of FIG. 9(a). However, the trailing curtain passes the point A at a point of time t3'; the travel of the trailing curtain comes to an end at a point of time t4'; and the light emission comes to a stop at a point of time t5'. In this instance t4' = t5'. The luminance of light emission by the LED 60 also can be obtained from Formula (2) above.

In accordance with the arrangement described, the film 50 is receiving an exposure light always in a constant quantity. However, in the event of an extremely long shutter time, the luminance of the light emitted by the LED 60 becomes extremely low to make confirmation of data imprinting hardly possible through the view finder. This problem can be solved by changing the luminance of the light of LED 60 to a value Bvo and by shortening the light emission time of the LED 60. This shortened light emission time Tv' can be obtained from the following formula:

$$Tv' = Bvo + Sv - Av \qquad (3)$$

The operation according to this arrangement is as shown in FIG. 9(c). In that instance, the points of time t1 and t2 remain unchanged from the cases of FIGS. 9(a) and 9(b). However, a point of time t5" at which the light emission is to be brought to a stop is determined by the light emission time Tv' obtained by Formula (3) above irrespective of the trailing curtain travel completion signal. Then, after the light emission is brought to a stop, the trailing curtain passes the point A at a point of time t3". The travel of the trailing curtain comes to an end at a point of time t4". Strictly speaking, a period of time corresponding to the light emission time Tv' is t5" − t1. A period of time during which the film 50 is actually exposed to light is a period indicated by hatching. There is a difference between the light emission time Tv' and the exposure time. However, with the light emission time Tv' arranged to be sufficiently long for a period of time required for the travel of the shutter curtain, this difference becomes ignorable.

Figure 10:
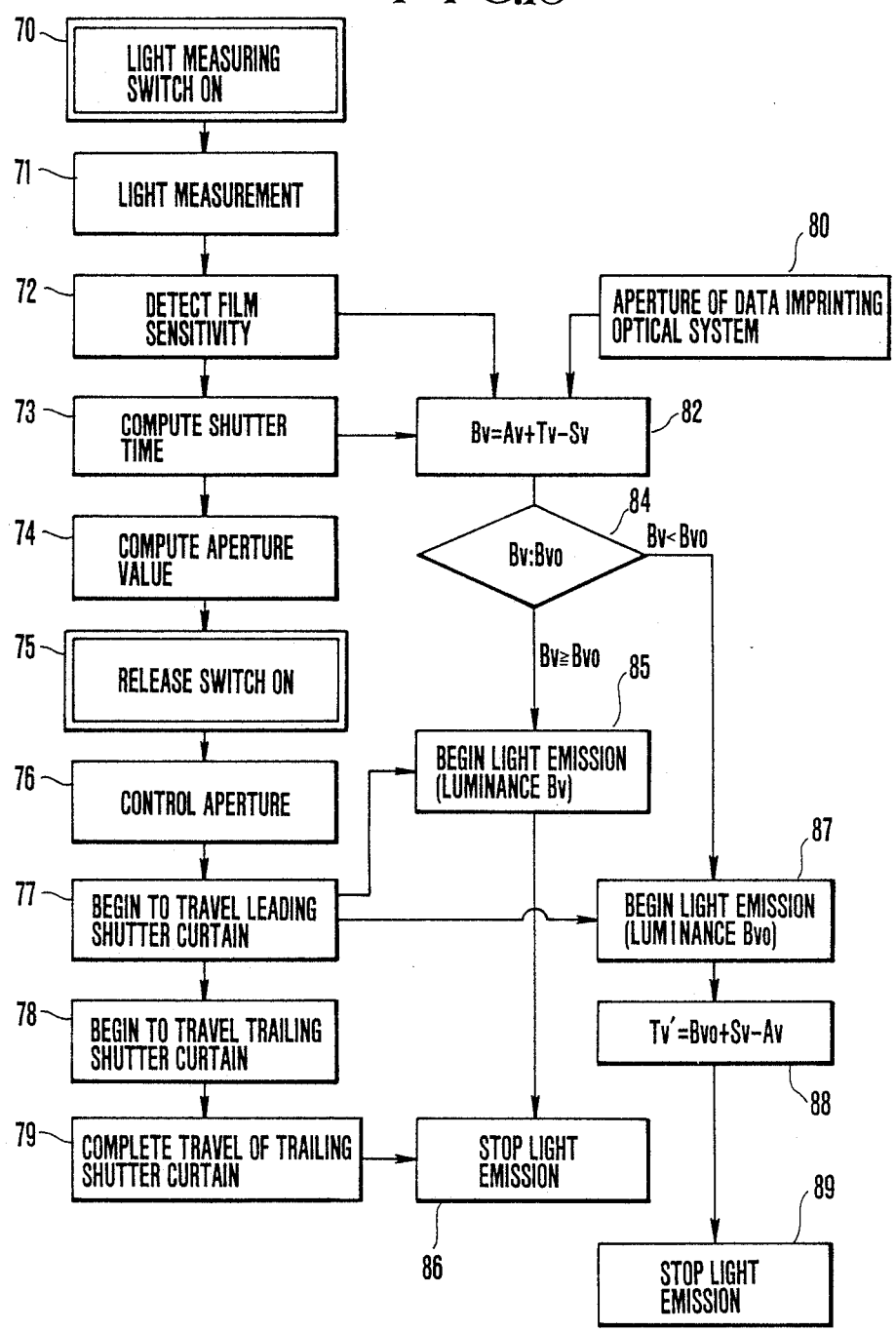
FIG. 10 is a flow chart showing the data imprinting operation to be performed by the third embodiment shown in FIG. 8.
Figure 11:
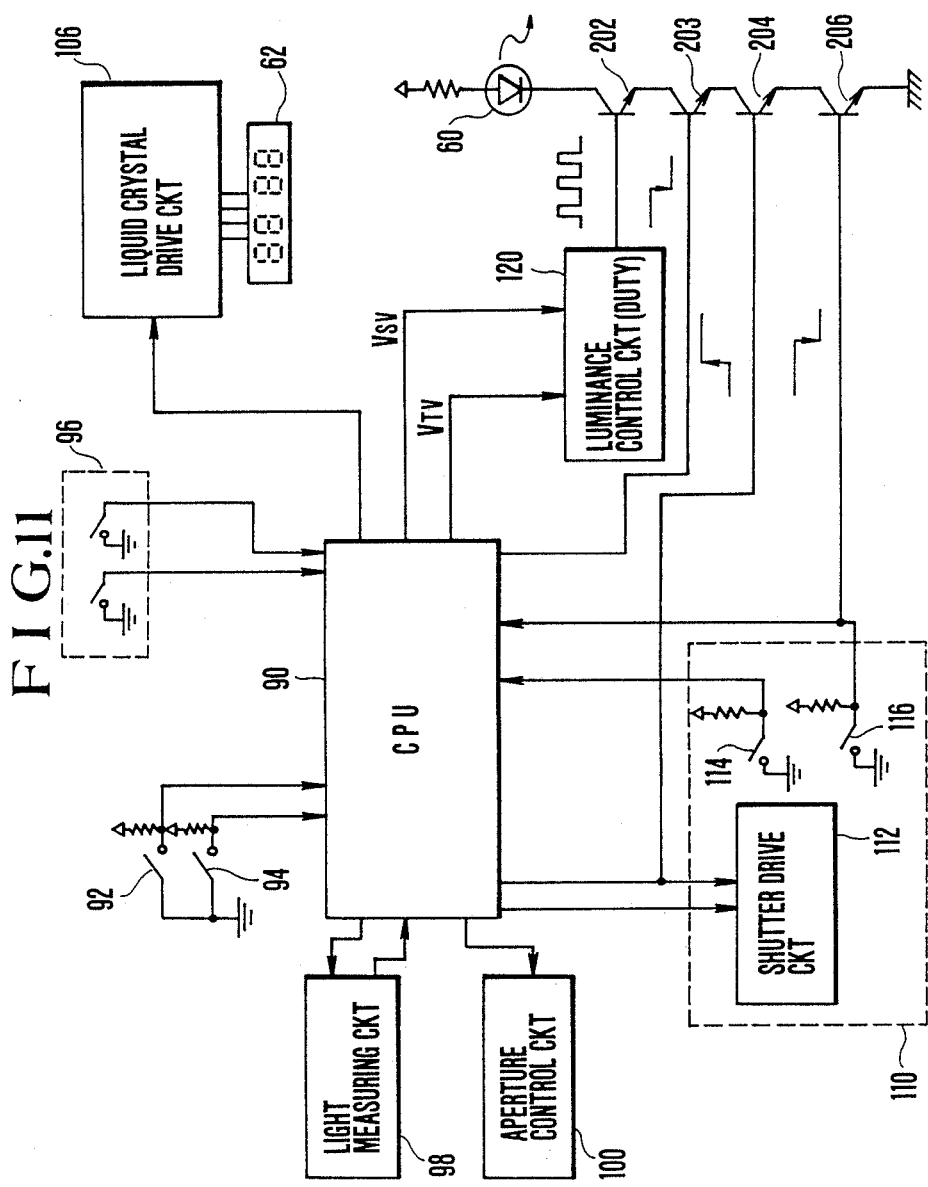
FIG. 11 is a circuit diagram showing the arrangement of a data imprinting circuit included in the third embodiment shown in FIG. 8.

The sequence of the data imprinting processes and a circuit arrangement are as shown in FIGS. 10, 11 and 12. Referring to FIGS. 11 and 12, the illustrations include a CPU 90; a light measuring switch 92 which turns on in response to the first step of an operation performed on a shutter release button; a release switch 94 which turns on in response to the second step of the operation on the shutter release button; a light measuring circuit 98 which is arranged to measure the luminance of an object to be photographed when the light measuring switch 92 turns on; and a group of switches 96 for input of various data. These data include, for example, data on film sensitivity, data for correcting a date to be imprinted, data on a shutter time to be employed for a manual photographing operation, an aperture value, etc. These data can be supplied to the CPU 90 through these data input switches. A shutter control arrangement 110 includes a shutter drive circuit 112; a leading shutter curtain travel completion switch 114 which is arranged to operate upon completion of the travel of the leading shutter curtain; and a trailing shutter curtain travel completion switch 116 which is arranged to operate upon completion of the travel of the trailing shutter curtain. The shutter drive circuit 112 is arranged to cause the leading and trailing shutter curtains to operate according to a shutter time value set either manually or by a program computed at the CPU 90 on the basis of information on the object obtained from the light measuring circuit 98. The switches 114 and 116 operate in response to the action of the shutter drive circuit 112 performed when the leading and trailing shutter curtains come close to the ends of their travels. Data produced from these switches 114 and 116 are supplied to the CPU 90. An aperture control circuit 100 is arranged to adjust a diaphragm 5 to an aperture value which is set either manually or by a program computed by the CPU 90. A liquid crystal drive circuit 106 is arranged to drive a transmission type liquid crystal 62. This drive circuit 106 receives a signal of data representing a date or the like and causes the applicable figure or alphabetical letter segments to operate. A luminance control circuit 120 is arranged to control the light emission luminance of the LED 60 which illuminates the above-stated transmission type liquid crystal 62 for imprinting data on the film 50. This circuit 120 receives from the CPU 90 the film sensitivity data VSV and the shutter time data VTV which are in the form of voltage information. Referring to FIG. 8, the luminance control circuit 120 includes a known amplification circuit 130; bleeder resistors 136, 138, 140 and 141; a constant voltage source 134; comparators 142, 144, 146 and 148; an oscillator 150; flip-flops 152, 154, 156 and 158; AND gates 160, 162, 164, 170, 172 and 176; and an OR gate 180. Upon receipt of the film sensitivity data VSV and the shutter time data VTV from the CPU 90, the luminance control circuit 120 has these data amplified by the amplification circuit 130. Amplified data thus produced from the circuit 130 are supplied via the bleeder resistors 136, 138, 140 and 141 to the comparators 142, 144, 146 and 148. The outputs of the comparators 142, 144, 146 and 148 are selected through comparison with the voltage of the constant voltage source 134. The flip-flops 152, 154, 156 and 158 receive a reference pulse signal from an oscillator 150 and produce frequency divided pulses as their $\overline{Q}$ outputs. These outputs are supplied to AND gates 170, 172, 174 and 176 in the form of pulse signals of different duties either directly or via AND gates 160, 162 and 164. Meanwhile, the outputs of the comparators 142, 144, 146 and 148 are supplied to the other input terminals of the AND gates 170, 172, 174 and 176. The AND gates 170, 172, 174 and 176 are thus opened and closed under the control of the outputs of the comparators 142, 144, 146 and 148. The outputs of the AND gates 170, 172, 174 and 176 which are thus selected by means of the outputs of the comparators 142, 144, 146 and 148 are supplied via an OR gate 180 to the base of a transistor 202. The above-stated LED 60 is allowed to emit a light only when the pulse signals produced from the AND gates 170, 172, 174 and 176 are at high levels. The luminance control circuit 120 is further arranged as follows: In the event that the shutter time set by the CPU 90 is a long time, the AND gate 170 is opened to have a low degree pulse signal of a small duty supplied to the transistor 202. One of other AND gates 172, 174 and 176 is opened in the order of 172→174→176 accordingly as the set shutter time becomes shorter in such a way as to supply the transistor 202 with a higher degree pulse signal of a larger duty. The film sensitivity value to be set at the data input switch group 96 is also arranged in a similar manner. When a film of a high sensitivity is loaded on the camera, the AND gate 170, which is arranged to produce the low degree pulse signal, is opened. The selection of the AND gates then shifts in the order of 172→174→176 according as the film sensitivity becomes lower. Thus, the LED 60 is arranged to be capable of emitting the light at a plurality of luminance values (four different luminance values in this particular embodiment).

The embodiment includes transistors 203, 204 and 206. A signal for forcedly putting out the light of the LED 60 is supplied from the CPU 90 to the base of the transistor 203. This signal normally remains at a high level. A shutter opening signal, i.e. a leading shutter curtain travel start signal, is supplied from the CPU 90 to the base of the transistor 204 to cause the transistor 204 to turn on concurrently with opening of the shutter. Further, the output of the trailing shutter curtain travel completion switch is supplied to the base of the transistor 206. When the shutter is closed upon completion of the travel of the trailing shutter curtain, the transistor 206 shifts from an ON state to an OFF state.

In other words, the LED 60, which is arranged to emit data imprinting light onto the film surface, lights up when the shutter is opened and the light is put out when the shutter is closed. The operation of the circuit arrangement is as described below:

Referring to FIG. 10 which is a flow chart, the light measuring switch 92 turns on in response to the first step of an operation performed on a shutter release button, at a step 70. Then, at a step 71, the light measuring circuit 98 measures the luminance of an object to be photographed. At a step 72, the CPU 90 detects the film sensitivity data obtained at the data input switch group 96. At steps 73 and 74, the CPU 90 computes a shutter time value and an aperture value on the basis of the luminance of the object and the film sensitivity data. Following this, at a step 75, the release switch 94 turns on when the operation on the shutter release button comes to the second step thereof. Then, at a step 76, the aperture control circuit 100 operates to stop down the aperture of the diaphragm. At a step 77, the shutter drive circuit 112 causes the leading shutter curtain to begin to travel. At a step 78, after the lapse of the computed shutter time, the trailing shutter curtain comes to travel. At a step 79, the trailing curtain travel completion switch 116 which is interlocked with the trailing shutter curtain produces the travel completion signal. By this, a photographing operation on one frame portion of the film is brought to an end.

Meanwhile, the luminance control circuit 120 obtains a luminance value Bv for the LED 60 on the basis of the film sensitivity data obtained at the step 72, the data of the aperture Av of the imaging lens 64 of the data imprinting optical system, which is obtained at a step 80 and the computed shutter time data which is obtained at the step 73. In this case, the data of the aperture Av of the above-stated imaging lens 64 is assumed to have been incorporated beforehand in the shutter time data VTV or the film sensitivity data VSV at the CPU 90. Then, at a step 84, the luminance value Bv of the LED 60 is compared with a predetermined visible limit of luminance Bvo. In the event of $Vb \leq Bvo$, the luminance for the LED 60 can be selected out of four different set values of luminance. In that instance, therefore, the LED 60 begins to emit a light at the selected value of luminance in synchronism with commencement of the travel of the leading shutter curtain, at a step 85. Then, at a step 86, the light emission by the LED 60 comes to a stop in synchronism with completion of the travel of the trailing shutter curtain.

Whereas, in case of $Bv < Bvo$, the luminance of the light of the LED 60 is set at the value Bvo which is, for example, a minimum luminance value obtainable by the luminance control circuit 120. The LED 60 then, at a step 87, begins to emit a light at the luminance value Bvo in synchronism with commencement of the travel of the leading shutter curtain. At a step 88, the CPU 90 determines the light emitting time Tv' by performing computation according to the formula of $Tv' = Bvo + Sv - Av$. At a step 89, after the lapse of the time Tv', the transistor 203 is forcedly turned off to bring the light emission of the LED 60 to an end.

In the event that a high luminance of the object results in a high shutter speed, the luminance of the light of the LED 60 must be increased accordingly. However, there is an increasable limit to the luminance of light emission by the ordinary LED element. Referring now also to FIG. 13 which is a program diagram, the following describes the cases where the luminance of light emission by the LED 60 is incapable of following high shutter speeds at which the camera can be set:

In the above-stated case, the CPU 90 changes the combination of the shutter time and the aperture of the camera to lower the shutter speed and to stop down the aperture accordingly. Referring to the program diagram of FIG. 13, a full line P1 represents a program line for an ordinary photographing operation not performing data imprinting. Assuming that the possible luminance of light emission by the LED 60 comes to its upper limit at a film sensitivity value of ISO 100 and at a shutter time value of 1/250 sec., the degree of exposure for data imprinting becomes insufficient when the object is brighter than a value EV 13. In this instance, an appropriate degree of exposure is obtainable for data imprinting up to a value EV 17 by changing the program line to another program line which is as represented by a broken line P2.

Further, in FIG. 13, a broken line P3 shows a case of correction where the film sensitivity is at a value ISO 50. Another broken line P4 shows a case where the film sensitivity is at ISO 200.

A feature of the embodiment described above resides in that the data imprinting operation is performed from the front surface of the film through the shutter. Therefore, the data can be imprinted at an adequate density irrespective of the kind of film. This arrangement solves the problem of the conventional data imprinting method in which data is imprinted from behind the film.

Further, in this embodiment, the light emission luminance or light emission time of the light emitting element for data imprinting is arranged to be adjustable according to the shutter time. This arrangement effectively solves the problem incidental to the method of imprinting data through a shutter.

In the case of this embodiment, if the shutter speed is too high for adjustment of the luminance of light emission by the data imprinting light emitting element, the shutter speed is shifted to a lower speed and the aperture is stopped down accordingly. Therefore, data imprinting can be accomplished always at an apposite exposure. It is a further advantageous feature of this embodiment that the half reflection mirror 26 is arranged to project the data imprinting light not only toward the film surface 50 but also toward the focusing screen 7. This arrangement enables the photographer to confirm the data imprinting and the data through the view finder.

In accordance with this invention, as described in the foregoing, the shutter device is arranged away from the aperture in the direction of the photo-taking lens; and, at least on one side of the aperture, the camera body constituting members such as a spool, chamber, a film cartridge, chamber, a sprocket, etc. can be laterally positioned to come within a projected image of the shutter device to permit reduction in the lateral size or transverse dimension of the camera body of a single-lens reflex camera. The invention thus permits reduction in size of a single-lens reflex camera.

The first, second and third embodiments respectively have various advantages as described in the foregoing.

What is claimed is:

1. A single lens reflex camera comprising:
   (a) a camera body having an aperture positioned at an image forming plane;
   (b) a photo-taking lens positioned opposite to said camera body aperture and having an optical axis centered on said camera body aperture and normal to said image forming plane;
   (c) a sprocket for selectively advancing a photo-taking film along said image forming plane behind said camera body aperture;
   (d) a shutter device, built in said camera body, which is arranged to open and close a shutter by allowing leading and trailing shutter curtains to travel, wherein an aperture of said shutter device is spaced away from the position of said camera body aperture in the direction of said photo-taking lens along said optical axis, and said sprocket is positioned next to said camera body aperture within a projected image of said shutter device;
   (e) an approximately 45 degree tilted mirror interposed in between said shutter device and said photo-taking lens, said mirror being a half reflection mirror permitting an image of the object to be transmitted therethrough to said camera body aperture;
   (f) a view finder optical system to which an image of said object is reflected and guided by said mirror; and
   (g) an aperture member formed at said photo-taking lens.

2. A camera according to claim 1, wherein said mirror is fixed in an approximately 45 degree tilted state and is arranged to remain in that 45 degree tilted state even during a shutter release operation.

* * * * *